(12) United States Patent
Chien et al.

(10) Patent No.: US 7,826,219 B2
(45) Date of Patent: Nov. 2, 2010

(54) CHANGEABLE STRUCTURE FOR FACEPLATE OF PORTABLE PERSONAL COMPUTER

(75) Inventors: Leo Ming Tz Chien, Taipei (TW); Chia-Shyong Cheng, Taipei (TW); Yu-Min Fang, Taipei (TW)

(73) Assignee: First International Computer, Inc., Taipei (TW)

( * ) Notice: Subject to any disclaimer, the term of this patent is extended or adjusted under 35 U.S.C. 154(b) by 204 days.

(21) Appl. No.: 12/258,522

(22) Filed: Oct. 27, 2008

(65) Prior Publication Data
US 2009/0219682 A1 Sep. 3, 2009

(30) Foreign Application Priority Data
Mar. 3, 2008 (TW) .............................. 97203619 U

(51) Int. Cl.
*G06F 1/16* (2006.01)
(52) U.S. Cl. ................................. 361/679.55
(58) Field of Classification Search ............ 361/679.55; 312/204, 216; 292/148; 206/457; 190/125; 40/312
See application file for complete search history.

(56) References Cited

U.S. PATENT DOCUMENTS

| | | | | |
|---|---|---|---|---|
| 5,701,230 A | * | 12/1997 | Liang et al. ............. | 361/679.27 |
| 6,125,033 A | * | 9/2000 | Andre et al. ............ | 361/679.55 |
| 6,173,837 B1 | * | 1/2001 | Marconi ................. | 40/312 |
| 6,301,102 B1 | * | 10/2001 | Ybarra ................... | 361/679.22 |
| 6,520,607 B2 | * | 2/2003 | Pfaff ..................... | 312/204 |
| 7,016,184 B1 | * | 3/2006 | Oneyama et al. ........ | 361/679.27 |
| 7,248,463 B2 | * | 7/2007 | Bander et al. .......... | 361/679.27 |
| 7,280,349 B2 | * | 10/2007 | Anderson et al. ....... | 361/679.27 |
| 7,697,271 B2 | * | 4/2010 | Kuo et al. .............. | 361/679.21 |
| 2001/0009498 A1 | * | 7/2001 | Oross et al. ............ | 361/681 |
| 2007/0115621 A1 | * | 5/2007 | Guillen ................. | 361/683 |
| 2008/0074832 A1 | * | 3/2008 | Chien et al. ........... | 361/683 |
| 2008/0074833 A1 | * | 3/2008 | Chien et al. ........... | 361/683 |
| 2008/0074834 A1 | * | 3/2008 | Chien et al. ........... | 361/683 |

\* cited by examiner

*Primary Examiner*—Lisa Lea-Edmonds

(57) ABSTRACT

A changeable structure for a faceplate of a portable computer comprises a portable computer and a cover plate; the portable computer is disposed with a housing having a faceplate; one end of the cover plate is pivotally coupled to the housing; the cover plate is disposed with a buckling element buckled up the faceplate. Whereby, the cover plate is allowed to liftably retain on the faceplate and cover a surface of the faceplate, an article is allowed to place in between the cover plate and the faceplate of the portable computer housing so as to vary an outlook or pattern of the faceplate of the computer to meet a requirement of matching the computer outlook with a personalized desire.

18 Claims, 6 Drawing Sheets

CHANGEABLE STRUCTURE FOR FACEPLATE OF PORTABLE PERSONAL COMPUTER

CROSS REFERENCE TO RELATED DOCUMENT

This application claims priority to TAIWAN Utility Model Patent Application No. 097203619, filed on Mar. 3, 2008.

BACKGROUND OF THE INVENTION

1. Field of the Invention

The present invention relates to a faceplate of a portable computer housing, and more particularly to a changeable structure for a faceplate of a portable personal computer.

2. Description of Related Art

A portable computer function is strong more and more lately, and the portable computer itself has a merit of convenient carrying such that it is popular to customers. A faceplate at the back of a display screen of a general portable computer almost is a fixed type and it does not allow a user to change a pattern thereon depending on his favorite or further provide a coupling structure for other article. Taiwan Patent Publishing No. 200743934, 200743935 and 200743936 respectively disclose a variety of changeable structures for a faceplate of a computer housing.

Furthermore, U.S. Pat. No. 7,206,618 entitled as "Removable customizable inserts and faceplate for electronic devices" discloses an electronic device comprising: a base having a first surface; a substantially transparent removable faceplate coupled to the base and covering substantially all of the first surface; and a replaceable ornamental insert positionable between the removable faceplate and the first surface of the base such that a portion of the ornamental insert is viewable through the substantially transparent section.

However, the patent mentioned above does not specifically discloses how the movable faceplate is coupled to the first surface of the base seat such that it is difficult to confirm whether an ornamental insert can be stably positioned between the movable faceplate and the base seat. Furthermore, when the inset wants to be changed, the movable faceplate must be separated from the base, and the movable faceplate must be placed at other place; if there is no proper location for allowing it to be placed, a user must use one hand to hold the movable faceplate all the time, and it will lower the convenience of changing an insert.

SUMMARY OF THE INVENTION

For conveniently replacing a thin article placed on a faceplate, the present invention is proposed.

The main object of the present invention is to provide a changeable structure for a faceplate of a portable computer, allowing a different modeling or pattern to be replaced on the faceplate of the computer conveniently.

Another object of the present invention is to provide a changeable structure for a faceplate of a portable computer, allowing a thin article to be coupled onto the faceplate conveniently and replaced with a different thin article conveniently.

Still another object of the present invention is to provide a changeable structure for a faceplate of a portable computer, capable of changing a different outlook for the same type of computer to provide for a different purchaser, and increasing a product sale amount of a fundamental type of product so as to be unnecessary to manufacture different outlooks or models of products respectively to save the production cost together with increasing a computer OEM's profit broadly.

BRIEF DESCRIPTION OF THE DRAWINGS

The present invention can be more fully understood by reference to the following description and accompanying drawings, in which.

DETAILED DESCRIPTION OF THE PREFERRED EMBODIMENTS

Figure 1:
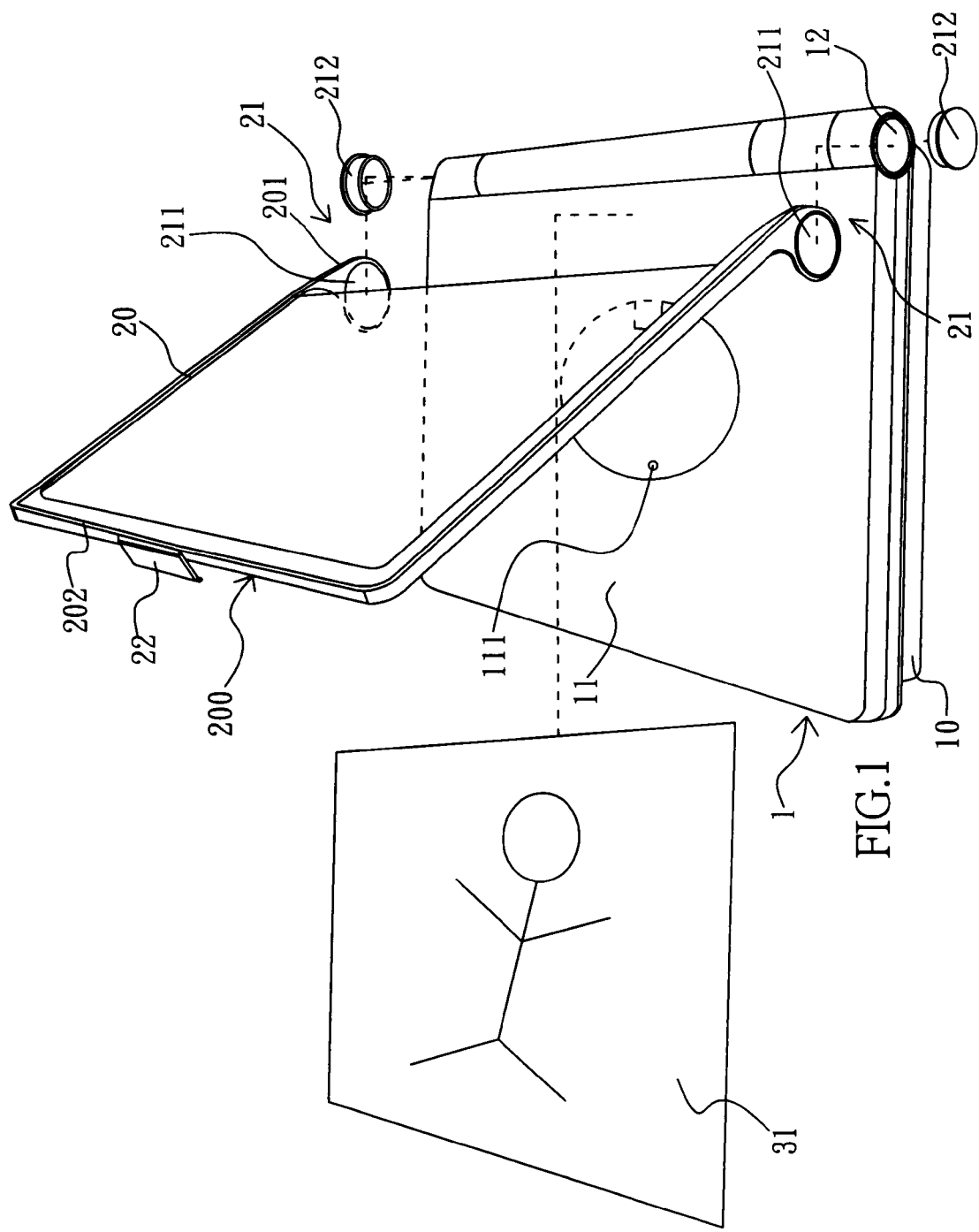
FIG. 1 is an exploded view, showing a changeable structure for a faceplate of a portable computer of a first preferred embodiment according to the present invention.
Figure 2:
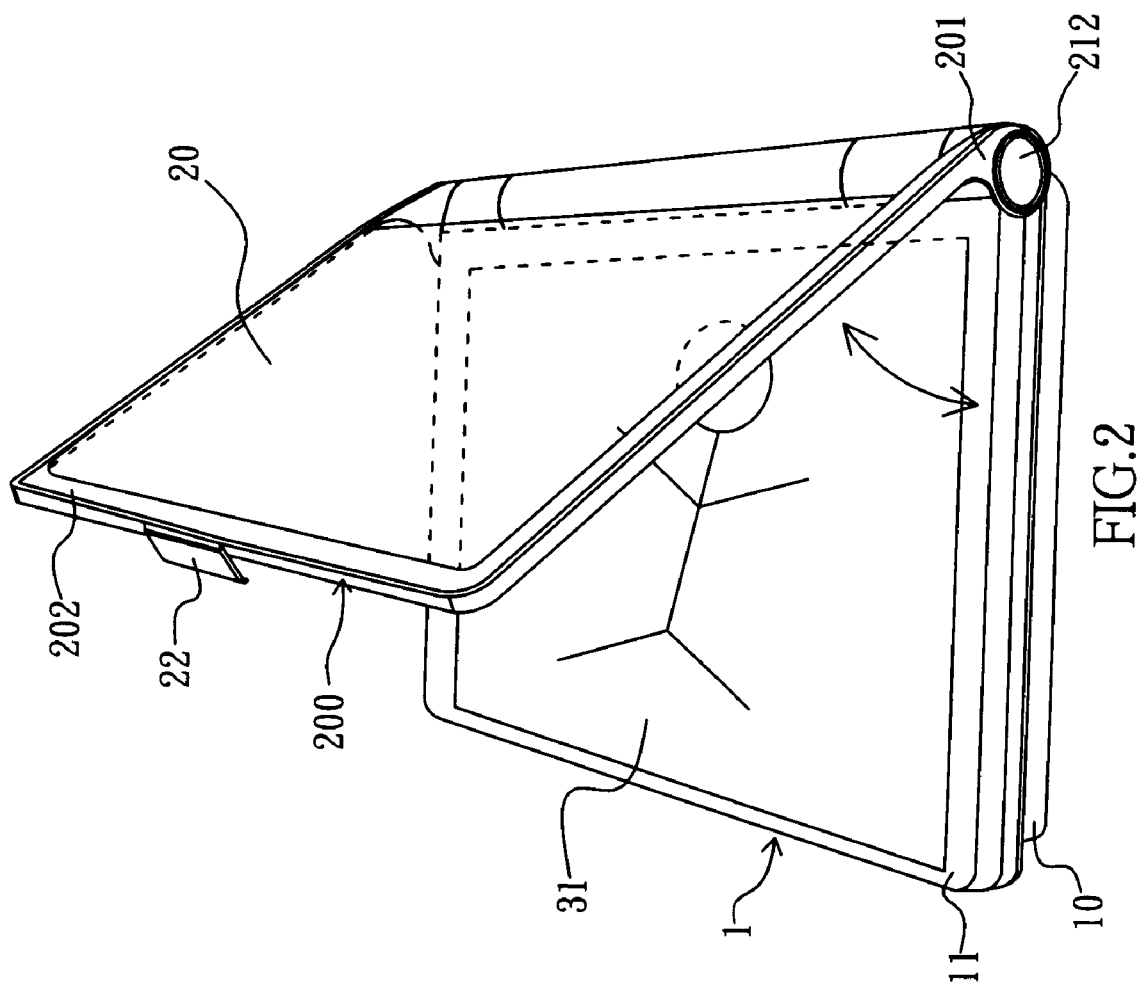
FIG. 2 is a perspective view, showing a portable computer of the first embodiment according to the present invention as a cover plate is not covered on a faceplate.
Figure 3:
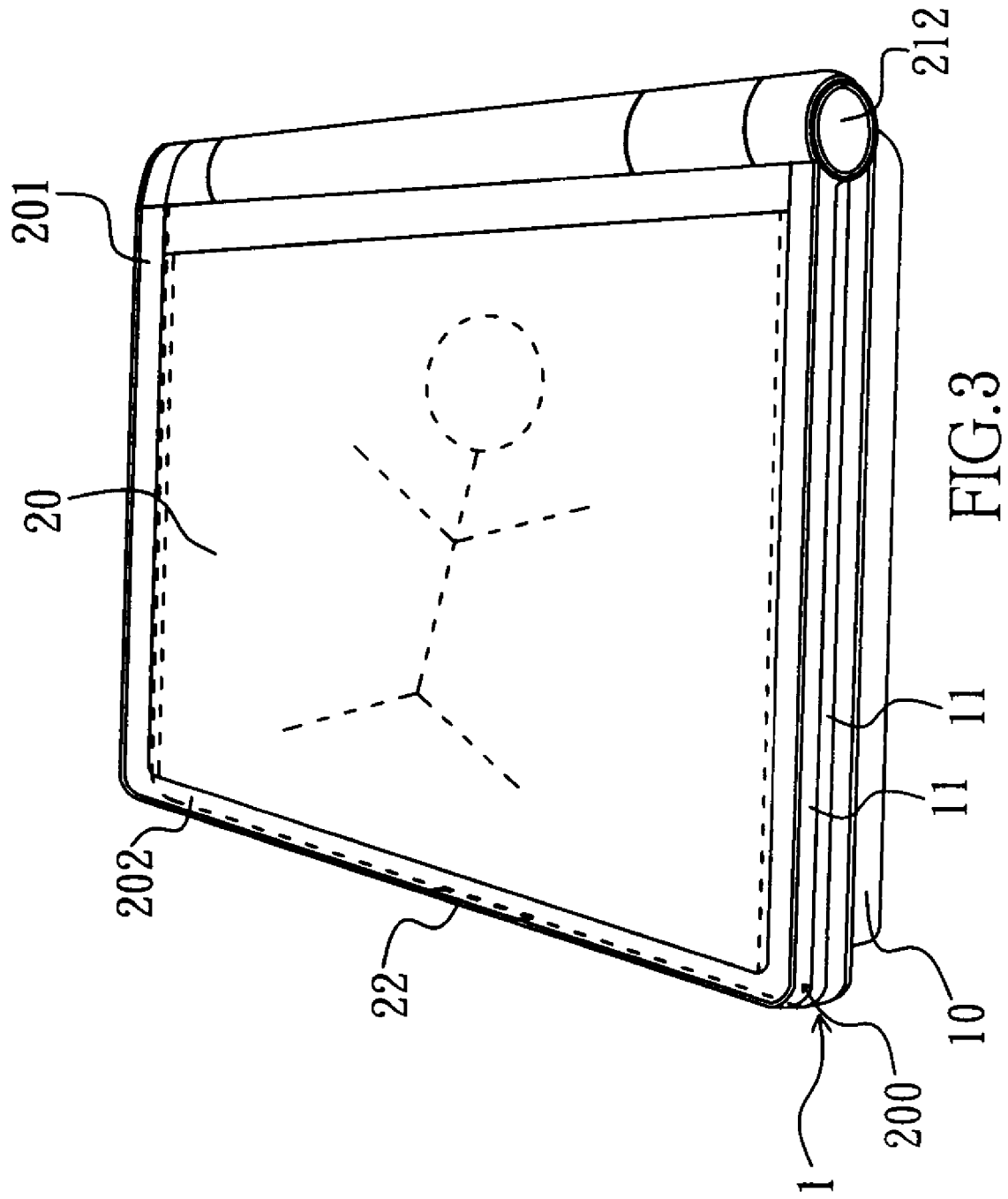
FIG. 3 is a perspective view, showing a portable computer of the first embodiment according to the present invention as a cover plate is covered on a faceplate.

Please refer to FIGS. 1, 2 and 3. A changeable structure for a faceplate of a portable computer according to the present invention is adapted to couple to a faceplate of a portable computer housing. A changeable structure for a faceplate of a portable computer of a first preferred embodiment according to the present invention comprises a portable computer 1 and a cover plate 2. The portable computer 1 is disposed with a housing 10; the housing 10 is provided with a faceplate 11; the faceplate 11 is positioned at the back of a display screen. A non-skid surface 111 is disposed on the faceplate 11, for example, non-skid raised lines are disposed on the faceplate 11 or a non-skid surface constituted by a thin sheet or raised lines made from an elastic material such as silica gel or rubber is coupled onto the faceplate 11. Two sides of the housing 10 are respectively disposed with a first pivoting portion 12. A front side and left, right sides of the cover plate 20 are respectively disposed with a bended edge 200 bended downward, the bended edges 200 can respectively propped against a front side and left, right sides of the faceplate 11. The cover plate 20 may cover a whole surface of the faceplate 11; two sides of a rear end 201 of the cover plate 20 are respectively disposed with a second pivoting portion 21 corresponding to the first pivoting portion 12 and a front end 202 of the cover plate 20 is disposed with a buckling element 22. The first pivoting portion 12 may be a groove and the second pivoting portion 21 is disposed with a pivoting hole 211 and a shaft 212. The first pivoting portion 12 is allowed to couple to the second pivoting portion 21 by passing the shaft 212 through the pivoting hole 211 to retain in the first pivoting portion 12 to enable the rear end 201 of the cover plate 20 to be pivotally coupled to the housing 10. The front end 202 of the cover plate 20 can be separated from the faceplate 11 as shown in FIG. 2 to enable a user to place in or take out a thin article 31 such as document or an ornamental pattern. The front end 202 of the cover plate 20 can also be attached onto the faceplate 11 and the buckling element 22 is buckled to a front rim of the faceplate 11 to allow the cover plate 20 and the faceplate 11 to be stably coupled to each other and in the meantime, the thin article 31 is placed in between the cover plate 20 and the faceplate 11 as shown in FIG. 3. Furthermore, the thin article 31 is allowed not to skid to deviate from a held position by allowing the non-skid surface 111 to press against a lower side of the thin article 31.

Figure 4:
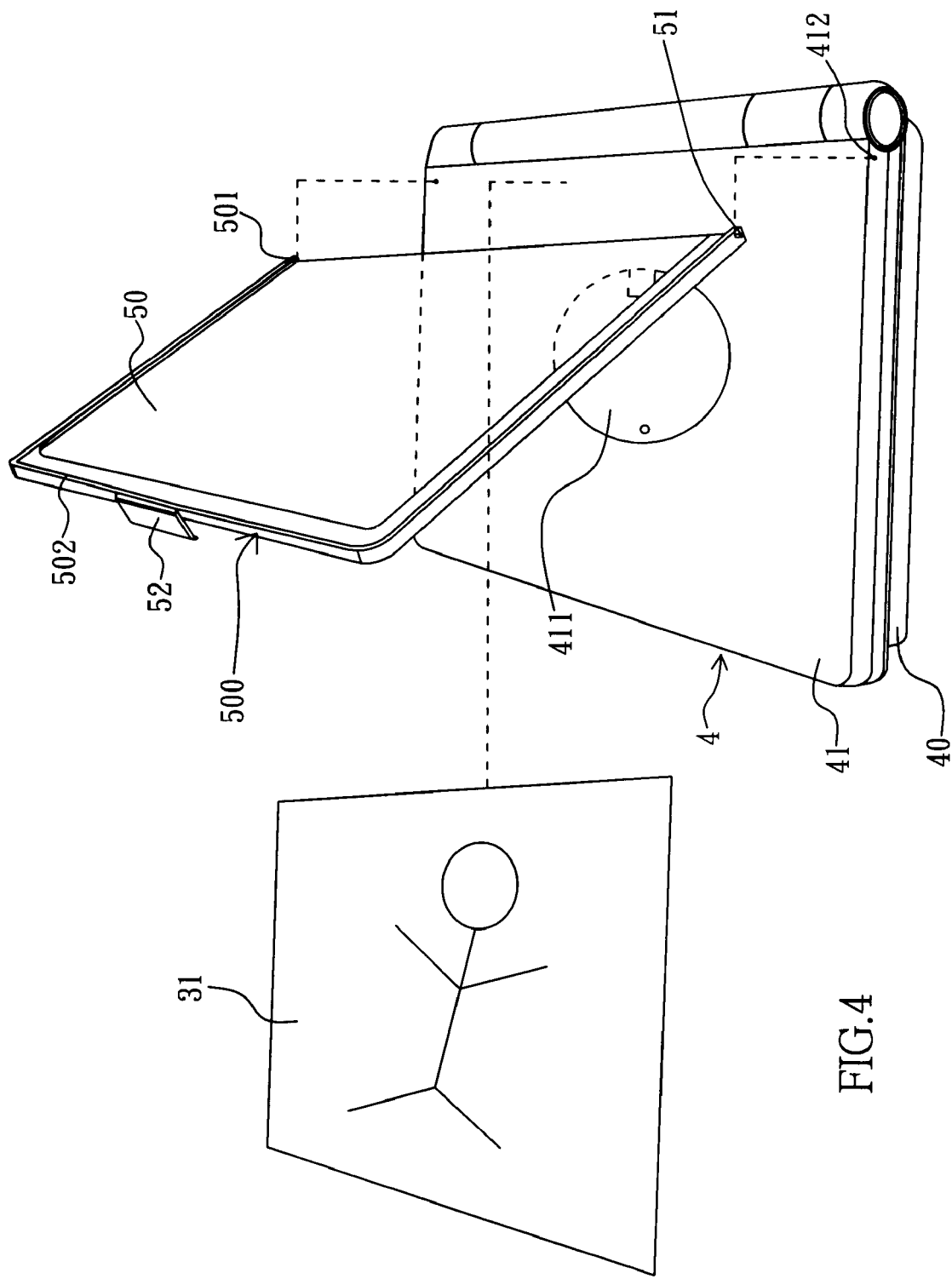
FIG. 4 is an exploded view, showing a changeable structure for a faceplate of a portable computer of a second preferred embodiment according to the present invention.
Figure 5:
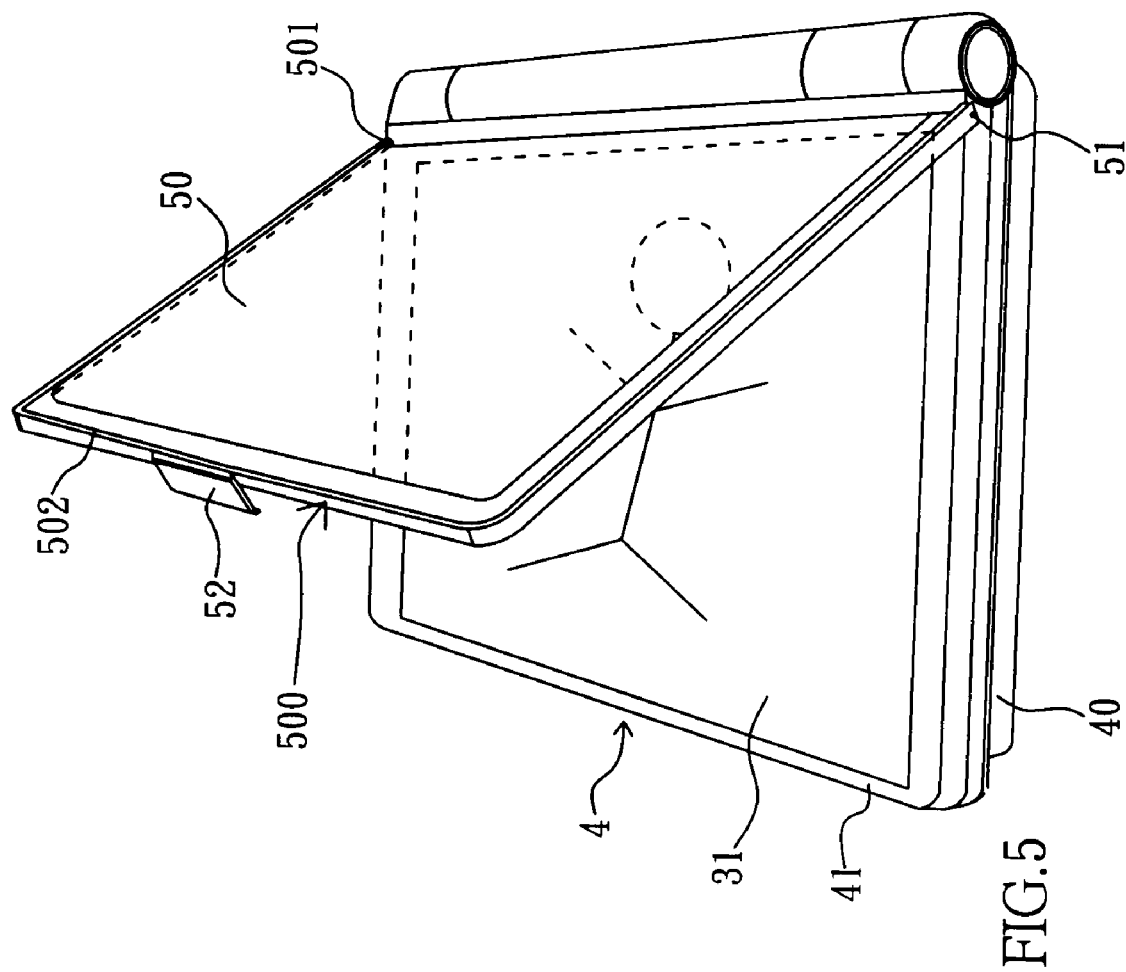
FIG. 5 is a perspective view, showing a portable computer of the second embodiment according to the present invention as a cover plate is not covered on a faceplate.
Figure 6:
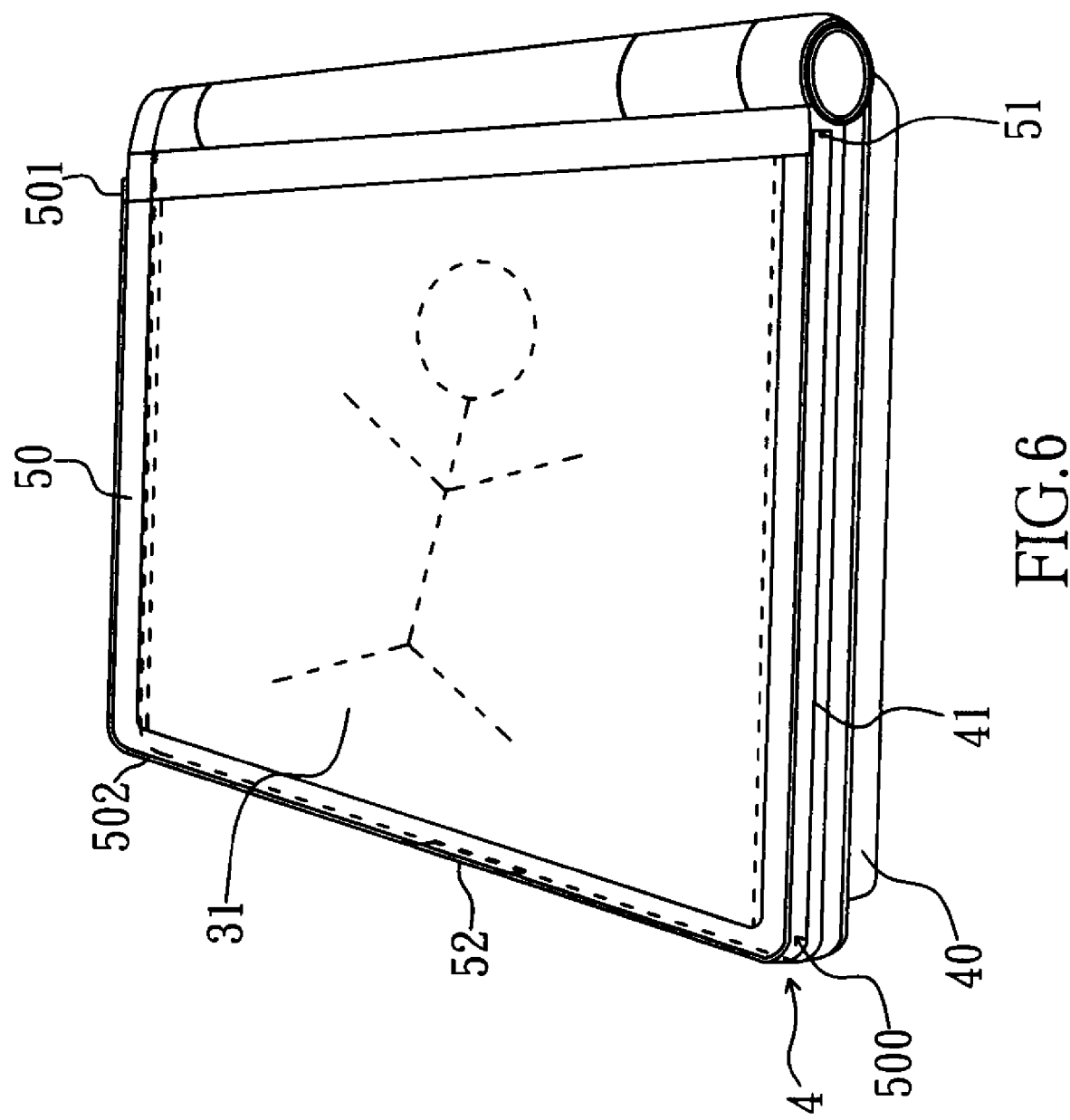
FIG. 6 is a perspective view, showing a portable computer of the second embodiment according to the present invention as a cover plate is covered on a faceplate

Please refer to FIGS. 4, 5 and 6. A changeable structure for a faceplate of a portable computer of a second preferred embodiment according to the present invention comprises a portable computer 4 and a cover plate 50. The portable computer 4 is disposed with a housing 40; the housing 40 is provided with a faceplate 41; the faceplate 41 is positioned at the back of a display screen. A non-skid surface 411 is disposed on the faceplate 41. Two sides of the faceplate 41 of the housing 40 are respectively disposed with a first pivoting portion 412. A front side and left, right sides of the cover plate 50 are respectively disposed with a bended edge 500 bended downward, the bended edges 500 can respectively propped against a front side and left, right sides of the faceplate 41. The cover plate 50 may cover a whole surface of the faceplate 41; two sides of a rear end 501 of the cover plate 50 are respectively disposed with a second pivoting portion 51 corresponding to the first pivoting portion 412 and a front end 502 of the cover plate 50 is disposed with a buckling element 52. The first pivoting portion 412 and the second pivoting portion 51 may respectively be a corresponding groove and shaft. The first pivoting portion 412 accepts the second pivoting portion 51 and the both are coupled to each other to enable the rear end 501 of the cover plate 50 to be pivotally coupled to the faceplate 41. The front end 502 of the cover plate 50 can be separated from the faceplate 41 as shown in FIG. 5 to enable a user to place in or take out a thin article 31 such as document or an ornamental graph. The front end 502 of the cover plate 50 can also be attached onto the faceplate 41 and the buckling element 52 is buckled to a front rim of the faceplate 41 to allow the cover plate 50 and the faceplate 41 to be stably coupled to each other and in the meantime, the thin article 31 is placed in between the cover plate 50 and the faceplate 41 as shown in FIG. 6. Furthermore, the thin article 31 is allowed not to skid to deviate from a held position by allowing the non-skid surface 411 to press against a lower side of the thin article 31.

A cover plate of the present invention may be a transparent plate body, or a upper side of the cover plate may be allowed to have a business title, trademark or ornamental pattern. After the cover plate is retained on a faceplate, a pattern of a thin article is exposed out of the transparent cover plate depending on the placed-in pattern, or an outlook of a housing of a portable computer is allowed to form a different variation of a modeling or pattern depending on a cover plate with a different ornamental pattern. The cover plate of the present invention may also have a writable and erasable plate face such as a user's erasable writing plate face of a whiteboard.

The present invention allows a thin article such as graph or document to be placed in between a cover plate and a faceplate, and taken out any time conveniently so as to replace with a different thin article to attain to a personalized variation requirement or a different cover plate to meet a different purchaser's requirement.

The present invention allows a cover plate to be coupled onto a faceplate to enable a portable computer to have a different personalized faceplate modeling to attain to the outlook varying effect by means of a design of having a cover plate with a different pattern.

A changeable structure for a faceplate of a portable computer disclosed by the present invention allows an outlook, pattern or material of a faceplate to be varied to attain to a requirement of matching a computer outlook with a personalized desire to stimulate a customer's purchase desire. Besides, a computer OEM utilizes the changeable structure for a faceplate of a portable computer disclosed by the present invention to allow the same type of computers to change different outlooks to provide for different purchasers. That is to say, only changing a cover plate or a placed-in pattern changes an outlook of a portable computer to attain to increasing the production and sale amount of the same fundamental type of products such that it is unnecessary to respectively manufacture different outlook and modeling of products to save the production cost and increasing the computer OEM's profit broadly.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A changeable structure for a faceplate of a portable computer, comprising:
   said portable computer, disposed with a housing, two sides of said housing being respectively disposed with a first pivoting portion, said housing having a faceplate; and a cover plate, two sides of said cover plate being respectively disposed with a second pivoting portion corresponding to said first pivoting portion; said cover plate being disposed with a buckling element;
   wherein, said first pivoting portion and said second pivoting portion are pivotally coupled to each other, said cover plate covers a surface of said faceplate; said buckling element is buckled up said faceplate.

2. The changeable structure for a faceplate of a portable computer according to claim 1, wherein said faceplate is disposed with said first pivoting portion; said first pivoting portion and said second pivoting portion are a corresponding groove and shaft.

3. The changeable structure for a faceplate of a portable computer according to claim 2, wherein a front end of said cover plate is disposed with said buckling element.

4. The changeable structure for a faceplate of a portable computer according to claim 3, wherein a front side and left, right sides of said cover plate are respectively disposed with a flange bended downward; said flanges are respectively propped against a front side and left, right sides of said faceplate.

5. The changeable structure for a faceplate of a portable computer according to claim 4, wherein said faceplate is disposed with a non-skid surface.

6. The changeable structure for a faceplate of a portable computer according to claim 1, wherein two sides of a rear end of said cover plate are respectively disposed with said second pivoting portion.

7. The changeable structure for a faceplate of a portable computer according to claim 6, wherein said first pivoting portion is a groove; said second pivoting portion is disposed with a pivoting hole and a shaft; said shaft is passed through said pivoting hole to retain in said first pivoting portion.

8. The changeable structure for a faceplate of a portable computer according to claim 7, wherein a front end of said cover plate is disposed with said buckling element.

9. The changeable structure for a faceplate of a portable computer according to claim 8, wherein a front side and left, right sides of said cover plate are respectively disposed with a bended edge bended downward; said flanges are respectively propped against a front side and left, right sides of said faceplate.

10. The changeable structure for a faceplate of a portable computer according to claim 9, wherein said faceplate is disposed with a non-skid surface.

11. The changeable structure for a faceplate of a portable computer according to claim 10, wherein said non-skid surface is constituted by one of non-skid raised lines disposed on said faceplate and an elastic material coupled onto said faceplate; wherein said elastic material is one of a thin sheet type and a lines type.

12. The changeable structure for a faceplate of a portable computer according to claim 5, wherein said non-skid surface is constituted by one of non-skid raised lines disposed on said faceplate and an elastic material coupled onto said faceplate; wherein said elastic material is one of a thin sheet type and a lines type.

13. The changeable structure for a faceplate of a portable computer according to claim 11, wherein said cover plate is provided with a writable and erasable plate face thereby providing a user with an erasable writing plate face.

14. The changeable structure for a faceplate of a portable computer according to claim 11, wherein said cover plate is a transparent plate body; a thin article is placed in between said cover plate and said faceplate.

15. The changeable structure for a faceplate of a portable computer according to claim 14, wherein said cover plate is provided with a writable and erasable plate face thereby providing a user with an erasable writing plate face.

16. The changeable structure for a faceplate of a portable computer according to claim 12, wherein said cover plate is provided with a writable and erasable plate face thereby providing a user with an erasable writing plate face.

17. The changeable structure for a faceplate of a portable computer according to claims 12, wherein said cover plate is a transparent plate body; a thin article is placed in between said cover plate and said faceplate.

18. The changeable structure for a faceplate of a portable computer according to claim 17, wherein said cover plate is provided with a writable and erasable plate face thereby providing a user with an erasable writing plate face.

* * * * *